(12) United States Patent
van Rooyen et al.

(10) Patent No.: US 7,460,607 B2
(45) Date of Patent: Dec. 2, 2008

(54) METHOD AND APPARATUS FOR SPACE-TIME TURBO-CODED MODULATION

(75) Inventors: Pieter van Rooyen, San Diego, CA (US); Danie van Wyk, Pretoria (ZA)

(73) Assignee: Broadcom Corporation, Irvine, CA (US)

( * ) Notice: Subject to any disclaimer, the term of this patent is extended or adjusted under 35 U.S.C. 154(b) by 401 days.

(21) Appl. No.: 10/606,924

(22) Filed: Jun. 26, 2003

(65) Prior Publication Data

US 2004/0057531 A1 Mar. 25, 2004

Related U.S. Application Data

(60) Provisional application No. 60/391,936, filed on Jun. 26, 2002.

(51) Int. Cl.
*H04L 5/12* (2006.01)

(52) U.S. Cl. .................................................. 375/265

(58) Field of Classification Search ................ 375/219, 375/220, 265, 267, 299, 347; 455/101, 25, 455/73, 103, 128; 704/242; 714/742, 745, 714/786; 370/319, 320, 321, 335, 336, 337, 370/342, 344, 347

See application file for complete search history.

(56) References Cited

U.S. PATENT DOCUMENTS

| | | | |
|---|---|---|---|
| 4,922,507 A | 5/1990 | Simon et al. | |
| 5,023,889 A | 6/1991 | Divsalar et al. | |
| 6,501,803 B1 * | 12/2002 | Alamouti et al. | 375/265 |
| 6,584,593 B1 * | 6/2003 | Seshadri et al. | 714/752 |
| 6,785,861 B2 * | 8/2004 | Scalise et al. | 714/786 |
| 6,795,424 B1 * | 9/2004 | Kapoor et al. | 370/343 |
| 7,003,324 B2 * | 2/2006 | Hiramatsu | 455/562.1 |
| 2002/0080008 A1 * | 6/2002 | Angus | 340/7.25 |
| 2002/0101934 A1 | 8/2002 | Kenney et al. | |
| 2003/0040331 A1 * | 2/2003 | Zhao | 455/552 |
| 2003/0043928 A1 * | 3/2003 | Ling et al. | 375/267 |
| 2003/0072381 A1 | 4/2003 | Ionescu | |

(Continued)

FOREIGN PATENT DOCUMENTS

JP 2002135134 5/2002

(Continued)

OTHER PUBLICATIONS

PCT/US03/20595—International Search Report or the Declaration mailed Mar. 2, 2004.

(Continued)

*Primary Examiner*—Sam K Ahn
(74) *Attorney, Agent, or Firm*—McAndrews, Held & Malloy, Ltd.

(57) ABSTRACT

An apparatus and method for transmitting a signal from a plurality of antennas. The apparatus includes an outer encoder configured to encode a stream of data according to a turbo multiple trellis coded modulation scheme, and generate a plurality of channel-coded symbol streams. The apparatus also includes an inner encoder serially concatenated with the outer encoder. The inner encoder is configured to receive the channel-coded symbol streams and provide space-time coding to the channel-coded symbol streams, thereby generating a plurality of space-time-channel-coded symbol streams. A plurality of antennas coupled are to the inner encoder, and each of the plurality of antennas is configured to transmit one of the plurality of space-time-channel-coded symbol streams.

22 Claims, 7 Drawing Sheets

U.S. PATENT DOCUMENTS

| | | |
|---|---|---|
| 2003/0072395 A1* | 4/2003 | Jia et al. .................... 375/341 |
| 2003/0112745 A1 | 6/2003 | Zhuang et al. |
| 2003/0133516 A1 | 7/2003 | Alamouti et al. |
| 2003/0174782 A1* | 9/2003 | Papadias et al. ............. 375/295 |
| 2003/0218973 A1 | 11/2003 | Oprea et al. |

OTHER PUBLICATIONS

D.J. van Wyk et al., "On the Construction of Layered Space-Time Coded Modulation STCM Codes Employing MTCM Code Design Techniques," IEEE VTC '99: Vehicular Technology Conference (Amsterdam, the Netherlands), Sep. 1999, pp. 2969-2973.

P. van Rooyen et al., *Space-Time Processing for CDMA Mobile Communications*, Kluwer Academic Publishers, 2000.

D. J. van wyk, "Four-dimensional $Q_2PSK$ modulation and coding for mobile digital communication," Master's thesis, University of Pretoria, South Africa, Apr. 1996.

J.E. Cilliers, et al., "A synchronous $Q^2PSK$ DS-CDMA system: System conceptualism, implementation and performance analysis," in Proceedings of ISSSTA '98, (Sun City, South Africa), Sep. 1998, pp. 4-8.

G. Ungerboeck, "Channel coding with Multilevel/Phase signals," IEEE Transactions on Information Theory, vol. IT-28, Jan. 1982, pp. 55-67.

G. Ungerboeck, "Trellis-Coded Modulation with redundant signal sets—Part 1: Introduction," IEEE Communications, vol. 25, Feb. 1987, pp. 5-11.

G. Ungerboeck, "Trellis-Coded Modulation with redundant signal sets—Part II: State of the art," IEEE Communications Magazine, vol. 25, Feb. 1987, pp. 12-21.

G. D. Boudreau, et al., "A comparison of trellis coded versus convolutionally coded spread-spectrum multiple-access systems," IEEE Journal on Selected Areas of Communication, vol. 8, May 1990, pp. 628-640.

D. Divsalar et al., "The design of Trellis Coded MPSK for fading channels: Performance Criteria," IEEE Transactions on Communications, vol. 36, Sep. 1988, pp. 1004-1012.

D. Divsalar et al., "The design of Trellis Coded MPSK for fading channels: Set Partitioning for optimum code design," IEEE Transactions on Communications, vol. 36, Sep. 1988, pp. 1013-1021.

V. Tarokh, et al., "Space-time codes for high data rate wireless communication: Performance criterion and code construction," IEEE Transactions on Information Theory, vol. 44, Mar. 1998, pp. 744-765.

E. Biglieri, et al., *Introduction to Trellis-Coded Modulation with Applications*, Macmillan, 548 pgs., 1991.

D. J. van Wyk, et al., "A multiple trellis coded $Q^2PSK$ system for wireless local loop applications," in PIMRC'97: International Symposium on Personal Indoor and Mobile Radio Communications, (Helsinki, Finland), Sep. 1997, pp. 624-628.

P. Robertson, "Coded modulation scheme employing turbo codes," Electronics Letters, vol. 31, No. 18, 1995, pp. 1546-1547.

P. Roberston et al., "A novel bandwidth efficient coding scheme employing turbo codes," in ICC'96: International Conference on Communications (Dallas, Texas, USA), Jun. 1996, pp. 962-967.

D. Divsalar et al., "Multiple Trellis Coded Modulation (MTCM)," IEEE Transactions on Communications, vol. 36, Apr. 1988, pp. 410-419.

Universal Mobile Telecommunications System (UMTS); Multiplexing and channel coding (FDD) (3GPP TS 25.212 version 3.5.0 Release 1999); ETSI TS 125 212 V3.5.0 (2000-12).

* cited by examiner $[C_0 \otimes D_{00}]$ $[C_0 \otimes D_{10}]$ $[C_0 \otimes D_{11}]$ $[C_0 \otimes D_{01}]$ $[C_0 \otimes D_{00}]$ $[C_0 \otimes D_{10}]$ $[C_0 \otimes D_{11}]$ $[C_0 \otimes D_{01}]$ $[C_0 \otimes D_{00}]$ $[C_0 \otimes D_{10}]$ $[C_0 \otimes D_{11}]$ $[C_0 \otimes D_{01}]$

METHOD AND APPARATUS FOR SPACE-TIME TURBO-CODED MODULATION

CROSS-REFERENCE TO RELATED APPLICATION

This application claims priority under 35 U.S.C. §119(e) to U.S. Provisional Application No. 60/391,936 entitled METHOD AND APPARATUS FOR SPACE-TIME TURBO-CODED MODULATION, filed Jun. 26, 2002, which is incorporated herein by reference in its entirety.

BACKGROUND OF THE INVENTION

1. Field of the Invention

The present invention relates generally to wireless communications and, more particularly, to a space-time and channel coding modulation scheme for use in wireless communication systems.

2. Background Information

As mobile radio-based communication becomes more widely accepted, it will be desirable to provide various types of radio-based communication services to meet consumer demand. For example, support for facsimile, e-mail, video, Internet access, and the like via radio-based communication systems is envisioned. Moreover, it is expected that mobile users may wish to access different types of services at the same time. For example, a video-conference between two mobile users would involve both speech and video support. Some of these different services will require relatively high data rates compared with speech service that has been conventionally supplied by mobile radio-based communication systems. Accordingly, next generation mobile radio-based communication systems are being designed to provide the high and variable-rate data rate communication bandwidth required by such services.

One such next or "third" generation radio-based communication system, termed the Universal Mobile Telecommunications System (UMTS), has been proposed by the Third Generation Partnership Project (3GPP). The 3GPP is comprised of various standard setting bodies, which have jointly endeavored to produce globally applicable technical specifications and technical reports for the UMTS. Although the UMTS defines a unique specification for radio-based communication, it is based on evolved Global System for Mobile Communications (GSM) core networks and the radio access technologies that they support (i.e., Universal Terrestrial Radio Access Network (UTRAN) including both Frequency Division Duplex (FDD) and Time Division Duplex (TDD) modes). It is anticipated that mobile radio-based communication networks compliant with the specifications of the UMTS will possess sufficient bandwidth to support the advanced services envisioned for third generation communication systems.

In view of the bandwidth requirements of the UMTS and other next generation cellular systems, utilization of advanced multidimensional modulation schemes may be considered. In the case of code division multiple access (CDMA) systems, for example, this may involve transitioning from the use of BPSK/QPSK modulation techniques to multi-dimensional modulation (e.g. multi-dimensional $Q^2$PSK).

It is anticipated that transitions such as this will rely heavily on the use of trellis coded modulation (TCM) and turbo trellis coding techniques. TCM has evolved over the past two decades as a combined coding and modulation technique for digital transmission over band-limited channels. TCM offers a significant advantages relative to classical coding schemes in both power and bandwidth efficiency. In operation, TCM schemes use redundant non-binary modulation in combination with a finite-state encoder that determines a corresponding signal shape to be transmitted over the applicable channel. At the receiver, the received signals are decoded by a soft-decision maximum-likelihood (ML) Viterbi or maximum a posteriori (MAP) decoder. It has been reported that simple four-state TCM schemes can improve the robustness of digital transmission against additive noise (i.e., the "coding gain") by 3 dB relative to conventional, uncoded modulation. With more complex TCM schemes the coding gain can reach 6 dB or more.

SUMMARY OF THE INVENTION

In one embodiment, the invention may be characterized as a system and method for transmitting a signal from a plurality of antennas. The inventive method includes the steps of: encoding a stream of data according to a turbo multiple trellis coded modulation scheme, thereby generating a plurality of parallel channel-coded symbol streams; space-time encoding the plurality of parallel channel-coded symbol streams, thereby generating a plurality of space-time-channel-coded symbol streams; and transmitting the plurality of space-time-channel-coded symbol streams.

In another embodiment, the invention may be characterized as an apparatus for transmitting a signal from a plurality of antennas, the apparatus including: an outer encoder configured to encode a stream of data according to a turbo multiple trellis coded modulation scheme, thereby generating a plurality of channel-coded symbol streams; an inner encoder coupled to the outer encoder, wherein the inner encoder is configured to receive the channel-coded symbol streams and provide space-time coding to the channel-coded symbol streams, thereby generating a plurality of space-time-channel-coded symbol streams; and a plurality of antennas coupled to the inner encoder, wherein each of the plurality of antennas is configured to transmit one of the plurality of space-time-channel-coded symbol streams.

DETAILED DESCRIPTION OF THE INVENTION

The present invention contemplates a unique space-time turbo-coded modulation (STTCM) modulation scheme in which a sequence of symbols are modulated with an inner code and an outer code. In an exemplary embodiment, the outer code is provided using turbo multiple trellis coded modulation (T-MTCM), while the inner code is provided using space-time coded modulation.

The STTCM scheme of the present invention results in substantial coding gains in mobile communication systems, particularly in systems operating in multipath fading environments. Advantageously, the STTCM scheme according to several embodiments of the present invention is applicable in fixed and wireless contexts to any form of digital communication system including voice, multi-media, navigational and telemetry communication systems.

The STTCM scheme in several embodiments is also applicable to a variety of communication protocols including time division multiple access (TDMA) and code-division multiple access (CDMA) in both single carrier and multiple carrier (e.g., orthogonal frequency division multiplexing (OFDM) contexts.

Some embodiments according to the present invention provide systems and methods that transmit signals from a plurality of antennas. The signals may be compliant with one or more of the following communication protocols: orthogonal frequency division multiplexing (OPDM); time division multiple access (TDMA); code division multiple access (CDMA); gaussian minimum shift keying (GMSK); complementary code keying (CCK); quadrature phase shift keying (QPSK); frequency shift keying (ASK); phase shift keying (PSK); and quadrature amplitude modulation (QAM).

Figure 1:
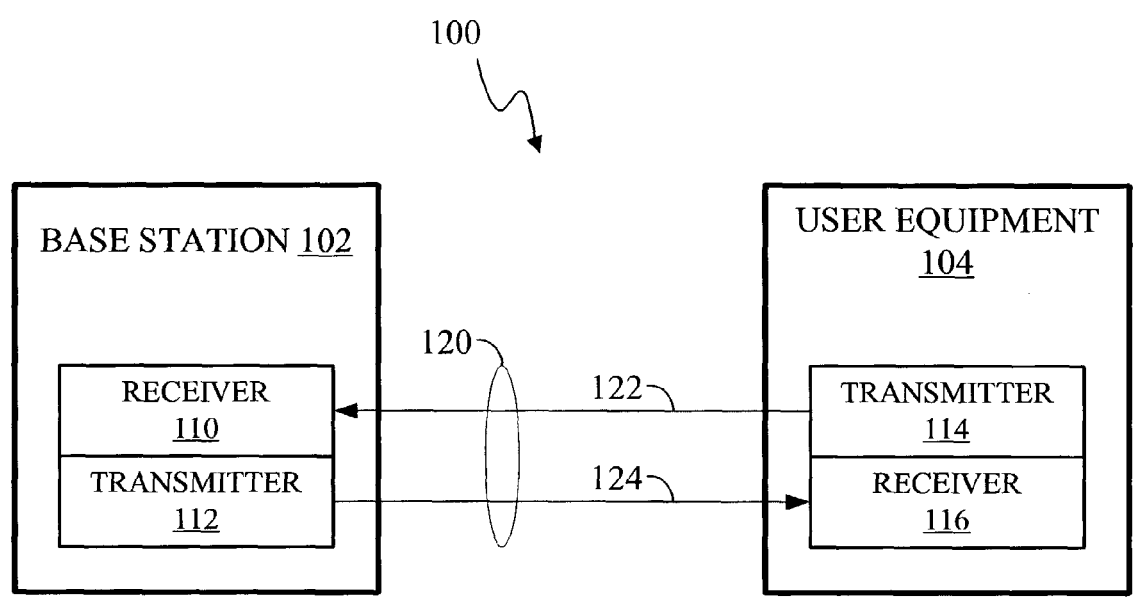
FIG. 1 is a high-level block diagram representation of a conventional UMTS mobile communication system in which some embodiments of the present invention is implemented.

FIG. 1 provides a high-level block diagram representation of a conventional UMTS mobile communication system 100 in which the present invention, in some embodiments, is implemented. As shown, user equipment (UE) 104 communicates with a base station 102 via a wireless link 120. The UE 104 may, for example, comprise a mobile radiotelephone handset or similar subscriber device (e.g., a PDA equipped with a radio transceiver). Wireless link 120 includes an uplink 122 and a downlink 124. A transmitter 112 in base station 102 transmits radio frames over downlink 124 that are received by a receiver 116 in UE 104. Similarly, a transmitter 114 in UE 104 transmits radio frames over uplink 122 that are received by a receiver 110 in base station 102. The transmitter/receiver pairs in base station 102 and UE 104 can be implemented, for example, as separate functional units (as depicted in FIG. 1) or as a single transceiver unit.

In some embodiments, the base station 102 and user equipment 104 represent residential transceivers in a local wireless network. In one embodiment for example, the base station 102 is an access point to other communication networks, for example, a cable interface or a satellite interface to an Internet (e.g., within a set-top box), while the user equipment 104 comprises mobile electronic devices, e.g., computers (PCs), laptops, televisions, stereos, appliances, palm devices, appliances, etc. In other embodiments, the base station 102 is a terrestrial base station in a cellular network and the user equipment 104 is a mobile handset. It should be noted, however, that the present invention is not limited to wireless communication networks.

In one embodiment, the transmitters 112 and 114 comply with the requirements set forth in 3GPP UTRAN FDD transmitter specifications, such as 3GPP TS 25.212 V3.5.0 (200-12) entitled "$3^{rd}$ Generation Partnership Project; Technical Specification Group Radio Access Network; Multiplexing and channel coding (FDD)" (Release 1999), the entirety of which is incorporated herein by reference. This specification is referred to herein as the 25.212 specification. It should be recognized, however, the present invention is in no way limited to applications utilizing the 25.212 specification.

Figure 2:
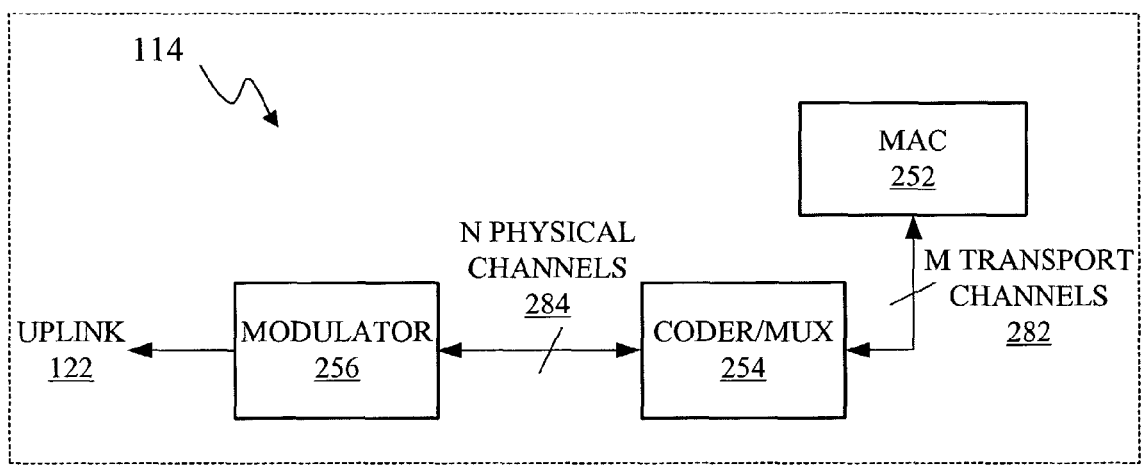
FIG. 2 is a block diagram depicting an overview of the architecture of the uplink transmitter of FIG. 1 according to one embodiment.

Referring next to FIG. 2, shown is a block diagram depicting an overview of the architecture of uplink transmitter 114 according to one embodiment. It should be noted that in several embodiments the downlink transmitter 112 is of substantially similar architecture. As shown, uplink transmitter 114 includes a medium access control (MAC) layer 252, a coding/multiplexing unit 254, and an output stage 256. The coding/multiplexing unit 254 functions to exchange data with MAC 252 in the form of transport block sets from M transport channels 282. These transport blocks are processed and multiplexed together by coding/multiplexing unit 254 into radio frame data provided over N physical channels 284. Within output stage 256, the radio frame data is gain-scaled, spread, scrambled, pulse-shaped and modulated in preparation for its transmission over uplink 122.

Figure 3:
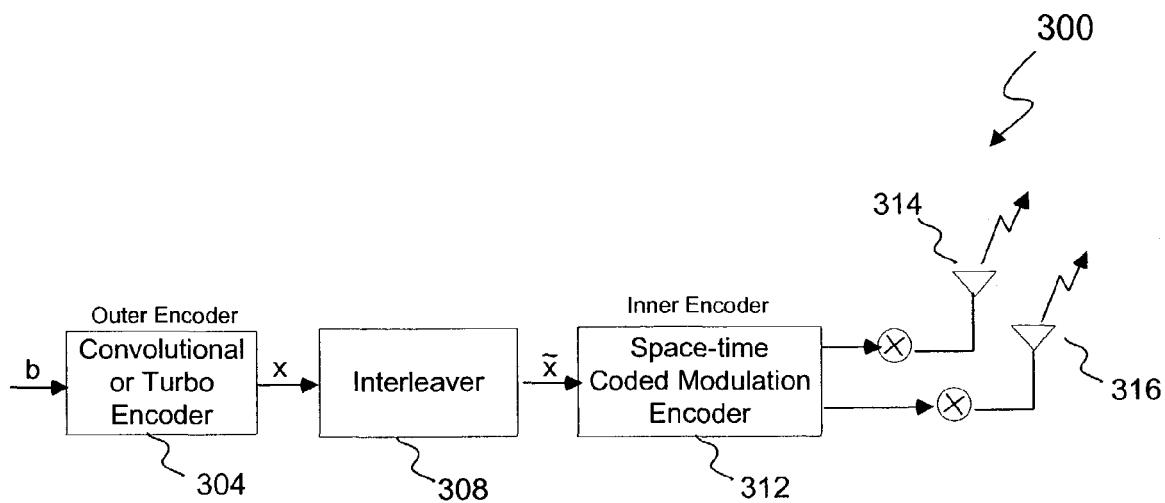
FIG. 3 is a block diagram depicting an STTCM modulator in accordance with several embodiments of the present invention.

Referring next to FIG. 3, shown is a block diagram generally depicting a space-time turbo-coded modulation (STTCM) modulator 300 in accordance with several embodiments of the present invention. In an exemplary embodiment of the present invention, the modulator 300 may be configured for inclusion in an uplink or a downlink transmitter, such as the uplink transmitter 114. The modulator 300 includes an outer encoder 304, an interleaver 308, and an inner encoder 312. In general, the outer encoder 304 is employed with a goal of maximizing coding gain, and the inner encoder 312 is employed with a goal of maximizing diversity gain.

The outer encoder 304, modulates an incident data stream and generates a corresponding symbol stream for interleaving within the interleaver 308. In some embodiments, the outer encoder 304 comprises a convolutional encoder, and in other embodiments, the outer encoder 304 comprises a turbo multiple trellis coded modulation T-MTCM encoder.

In some embodiments, the outer encoder 304 is a multiple trellis coded modulation (MTCM) encoder designed in accordance with design criteria set forth in the publication entitled: *On the Construction of Layered Space-Time Coded Modulation STCM Codes Employing MTCM Code Design Techniques*; by D. J. van Wyk, I. J. Oppermann, E. Pretorius, and P. G. W. van Rooyen; in IEEE VTC'99: Vehicular Technology Conference, (Amsterdam, The Netherlands), pp. 2969-2973, September 1999, which is hereby incorporated by reference in its entirety.

The inner encoder 312 then modulates the interleaved, modulated symbols from the interleaver 308. In several embodiments, the inner encoder 312 is a space-time coded modulation encoder, which in some embodiments, is realized using conventional space-time processing techniques including, for example, block, convolutional and trellis coding. Implementation of space-time processing techniques is further described in the publication entitled: *Space-Time Processing for CDMA Mobile Communications*; by Pieter van Rooyen, Michael Lotter, and Danie van Wyk; Kluwer Academic Publishers, 2000, which is hereby incorporated by reference in its entirety.

The modulated signals from the inner encoder 312 are then upconverted to RF signals that are transmitted by transmit antennas 314, 316. In some embodiments, the antennas 314, 316 are separated to provide transmit diversity. In one embodiment, for example, the antennas 314, 316 are separated so that a fading correlation between the antennas 314, 316 is reduced to below 0.5.

In several embodiments, the space-time turbo-coded modulation (STTCM) modulator 300 is constructed according to a systems based approach. In other words, after the individual components (e.g., the outer and inner encoders 304, 312) of the STTCM modulator 300 have been optimized on an individual basis, the STTCM modulator 300 is analyzed and evaluated to make sure the best overall performance is achieved.

In some embodiments for example, the outer encoder 304 and the inner encoder 312 are first individually optimized to maximize coding gain and diversity gain respectively, and then, once the outer and inner encoders 304, 312 are combined, the complete system performance of the STTCM modulator 300 is optimized. In one embodiment, an EXIT chart based analysis is utilized to evaluate information transfer between constituent system blocks (e.g., between the outer and inner encoders 304, 312), and to identify critical system parameters that include, for example, the number of turbo iterations, stopping criteria, and symbol interleaver span and depth.

It should be recognized that the present invention is applicable to both single carrier systems, e.g., GSM systems, and multi-carrier systems, e.g., OFDM systems. As one of ordinary skill in the art recognizes, the space-time turbo-coded modulation (STTCM) modulator 300 may be implemented in an OFDM system, for example, by simply changing the outer encoder 304. In some embodiments, the inner encoder 312 and the decoder can be used in an OFDM system without significant changes.

Figure 4:
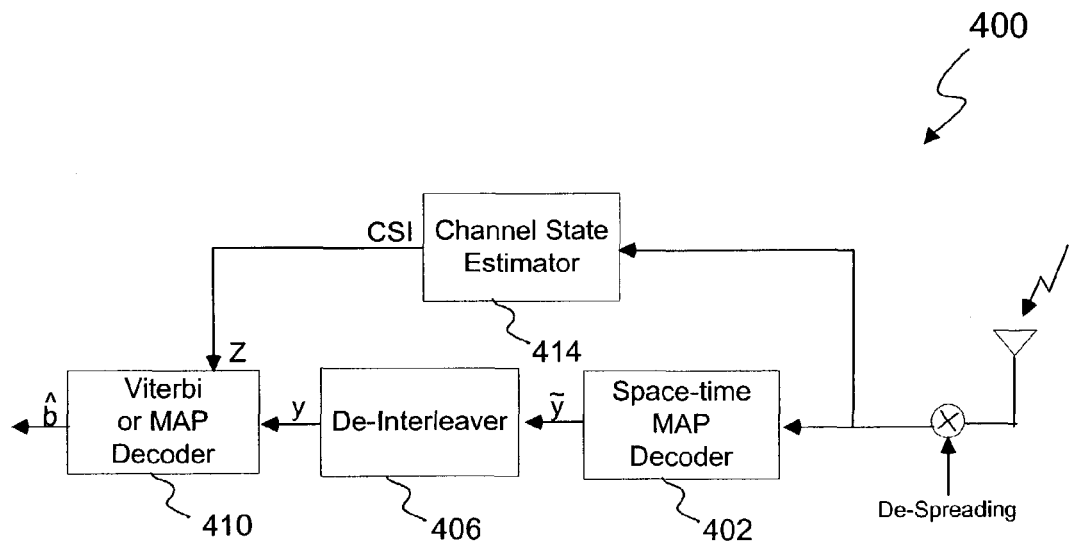
FIG. 4 is a block diagram of an STTCM demodulator in accordance with several embodiments of the present invention.

Referring next to FIG. 4, shown is an STTCM demodulator 400 in accordance with several embodiments of the present invention. The STTCM demodulator 400 includes a space-time maximum a posteriori (MAP) decoder 402 disposed to process the received signal after despreading. The decoded signal from the space-time MAP decoder 402 is provided to a de-interleaver 406, which feeds a decoder 410, which in some embodiments is a Viterbi decoder, and in other embodiments is a MAP decoder. As shown, a channel state estimator 414 is coupled between the input of the space-time MAP decoder 402 and the decoder 410.

In one embodiment, dispreading, descrambling and de-interleaving is performed in dedicated hardware and turbo decoding is performed by a digital signal processor (DSP).

Figure 5:
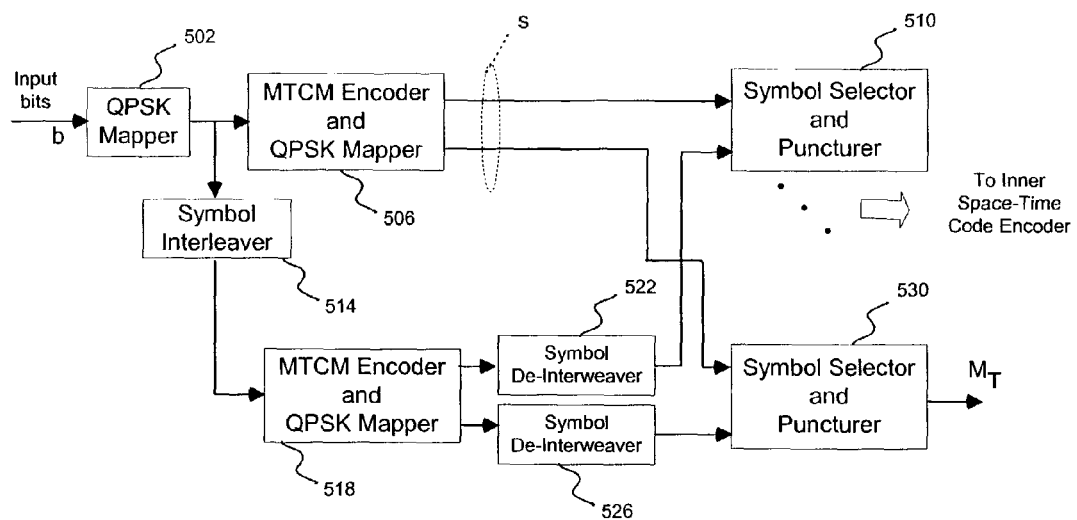
FIG. 5 is a block diagram of one embodiment of the outer encoder of FIG. 3.

Referring next to FIG. 5, shown is a block diagrammatic representation of an exemplary implementation of the outer encoder 304 of FIG. 3 as a multiple trellis coded modulation (MTCM) encoder. As shown, a first QPSK mapper 502 receives input data and provides a corresponding symbol stream to a first MTCM encoder & QPSK mapper unit 506 and to a symbol interleaver 514. As is indicated by FIG. 5, the output from the first MTCM encoder & QPSK mapper unit 506 is processed by a first symbol selector & puncture 510 operative to provide a first punctured symbol stream to the inner encoder 312.

The output from the symbol interleaver 514 is provided to an $M^{th}$ MTCM encoder & QPSK mapper unit 518, which in turn feeds symbol de-interleavers 522 and 526. An $M^{th}$ symbol selector & puncture 530, which is responsive to the first MTCM encoder & QPSK mapper unit 506 and to the symbol de-interleaver 526, generates an $M^{th}$ punctured symbol stream for the inner encoder 312.

Figure 6A:
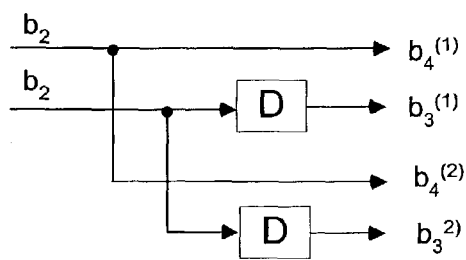
FIGS. 6A and 6B are input/ouput/state connection diagrams for 2-state and 4-state implementations of the outer encoder of FIG. 5 respectively.
Figure 6B:
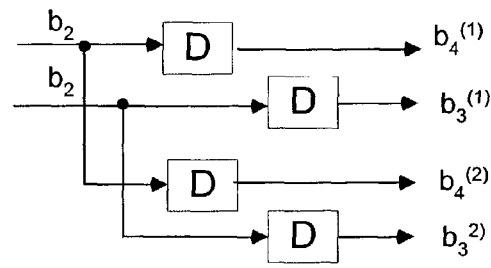
Figure 7A:
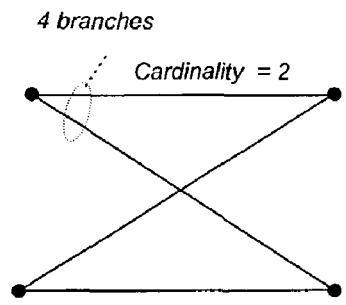
FIGS. 7A and 7B are trellis diagrams according to at least some aspects of one or more embodiments according to the present invention.
Figure 7B:
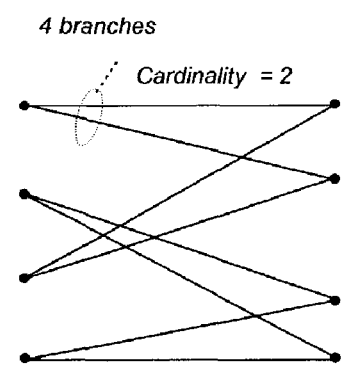

FIGS. 6A and 6B are input/ouput/state connection diagrams for 2-state and 4-state implementations of the outer encoder 304, respectively. Similarly, FIGS. 7A and 7B are trellis diagrams for space-time codes for 2-state and 4-state implementations of the outer encoder 304, respectively.

Figure 8:
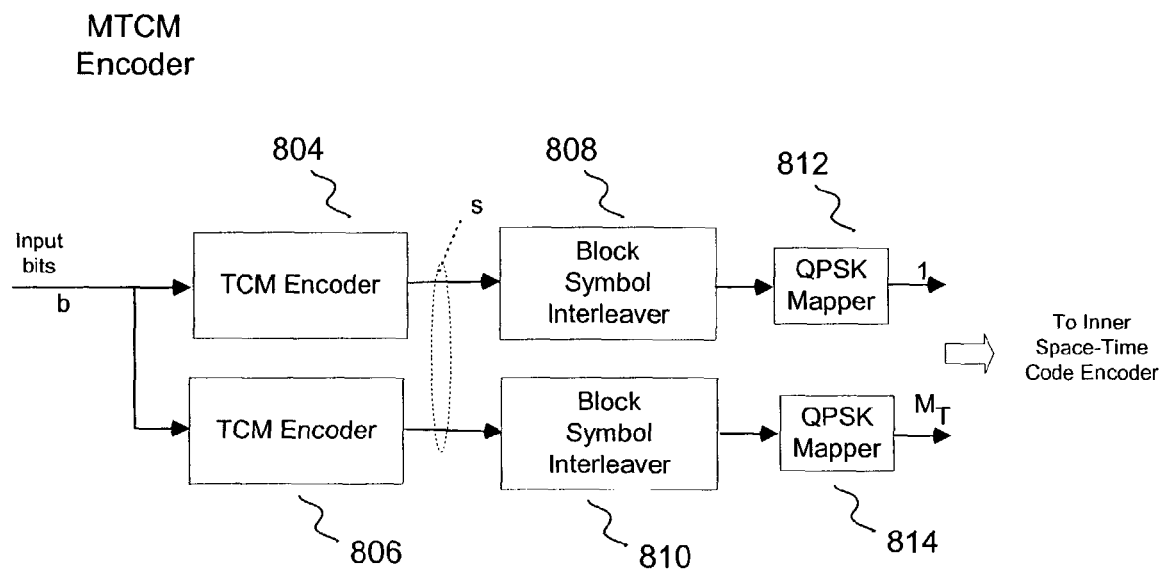
FIG. 8 is a block diagram of another embodiment of the outer encoder of FIG. 3.

FIG. 8 is a block diagram illustrating another embodiment of the outer encoder 304 of FIG. 3 as a space-time turbo multiple trellis coded modulation T-MTCM encoder. As shown, a first trellis coded modulation (TCM) encoder 804 and an $M^{th}$ trellis coded modulation (TCM) encoder 806 receive input data and provide corresponding coded symbol streams to a first block symbol interleaver 808 and an $M^{th}$ block symbol interleaver 810 respectively.

The outputs from the block symbol interleavers 808, 810 are provided to a first and $M^{th}$ QPSK mapper units 812, 814 respectively, which in turn, feed an inner space-time encoder, e.g., the inner encoder 312.

Figure 9A:
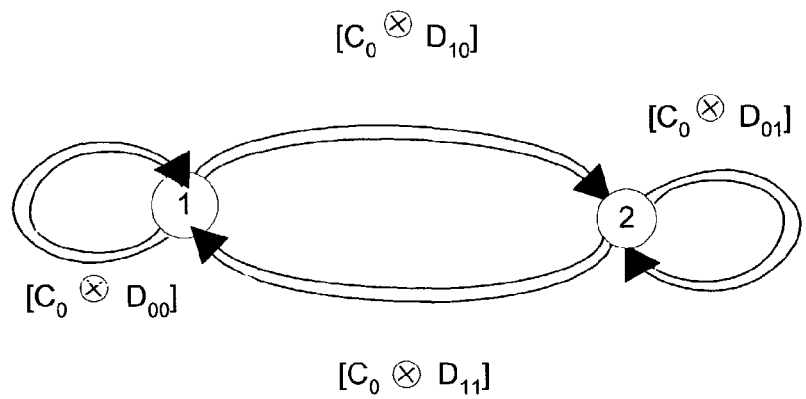
FIGS. 9A and 9B illustrate state and superstate diagrams respectively for a rate-2/4 space-time outer code for the outer encoder of FIG. 8.
Figure 9B:
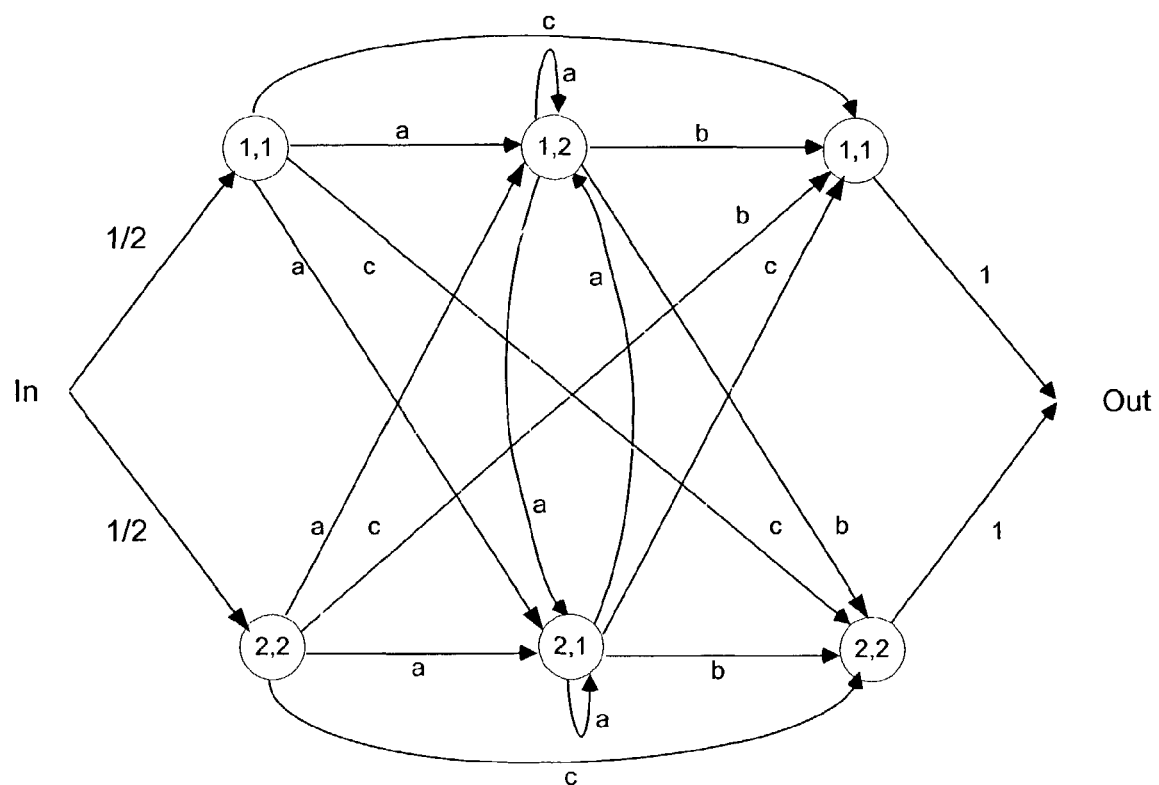

FIGS. 9A and 9B respectively depict state and superstate diagrams for a rate-2/4 space-time outer code for the outer encoder of FIG. 8.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A wireless mobile cellular phone having a plurality of antennas, comprising:
   a quadrature phase shift keying (QPSK) mapper configured to receive input data;
   a first multiple trellis coded modulation (MTCM) encoder and QPSK mapper unit coupled to the QPSK mapper;
   a first symbol selector and puncturer operatively coupled to the first MTCM encoder and QPSK mapper unit, the first symbol selector and puncturer being configured to provide a first channel-coded symbol stream;
   a symbol interleaver operatively coupled to the QPSK mapper;
   a second MTCM encoder and QPSK mapper unit operatively coupled to the symbol interleaver;
   a symbol de-interleaver arrangement operatively coupled to the second MTCM encoder and QPSK mapper unit;
   a second symbol selector and puncturer operatively coupled to the symbol de-interleaver arrangment, the second symbol selector and puncturer being configured to provide a second channel-coded symbol stream; and
   a particular encoder operatively coupled to the first and second symbol selector and puncturer and to the second symbol selector and puncturer, the particular encoder being configured to receive the first channel-coded symbol stream and the second channel-coded symbol stream, the particular encoder providing space-time coding to the first channel-coded symbol stream and to the second channel-coded symbol stream, the particular encoder generating a first space-time-channel-coded symbol stream and a second space-time-channel-coded symbol stream, wherein the wireless mobile cellular phone supports orthogonal frequency division (OFDM) multiplexing, wherein the wireless mobile cellular phone comprises a personal digital assistant (PDA) equipped with a wireless transceiver, wherein the wireless mobile cellular phone supports wireless communications with a wireless local area network, wherein at least the QPSK mapper, the first MTCM encoder and QPSK mapper unit, the second MTCM encoder and QPSK mapper unit and the particular encoder are part of an outer encoder and/or an inner encoder, and wherein information transferred between the inner encoder and the outer encoder is evaluated to determine at least a number of turbo iterations, a stopping criteria, a symbol interleaver span and a symbol interleaver depth.

2. The wireless mobile cellular phone according to claim 1, wherein the wireless spread spectrum mobile cellular phone supports redundant non-binary modulation in combination with a finite-state encoder.

3. The wireless mobile cellular phone according to claim 1, wherein the wireless mobile cellular phone supports code division multiple access, voice communications, multimedia communications and navigational communications.

4. The wireless mobile cellular phone according to claim 1, wherein the wireless mobile cellular phone supports spread spectrum modulation.

5. The wireless mobile cellular phone according to claim 1, wherein the wireless mobile cellular phone supports voice communications and multimedia communications.

6. The wireless mobile cellular phone according to claim 1, wherein the wireless mobile cellular phone supports navigational communications.

7. The wireless mobile cellular phone according to claim 1, wherein the wireless mobile cellular phone supports a Universal Mobile Telecommunications System mobile communications device.

8. The wireless mobile cellular phone according to claim 1, wherein the symbol de-interleaver arrangement comprises a plurality of symbol de-interleavers.

9. A wireless spread spectrum mobile cellular phone having a plurality of antennas in which two of the plurality of antennas are each configured to transmit one of a first space-time-channel-coded symbol stream and a second space-time-channel-coded symbol stream, the wireless spread spectrum mobile cellular phone comprising:

a quadrature phase shift key (QPSK) mapper configured to receive input data;

a first multiple trellis coded modulation (MTCM) encoder and QPSK mapper unit operatively coupled to the QPSK mapper;

a first symbol selector and puncturer coupled to the first MTCM encoder and QPSK mapper unit, the first symbol selector and puncturer is configured to provide a first channel-coded symbol stream;

a symbol interleaver operatively coupled to the QPSK mapper;

a second MTCM encoder and QPSK mapper unit operatively coupled to the symbol interleaver;

a symbol de-interleaver arrangement operatively coupled to the second MTCM encoder and QPSK mapper unit;

a second symbol selector and puncturer operatively coupled to the symbol de-interleaver arrangment, the second symbol selector and puncturer being configured to provided a second channel-coded symbol stream; and a particular encoder operatively coupled to the first symbol selector and puncturer and to the second symbol selector and puncturer, the particular encoder being configured to receive the first channel-coded symbol stream and the second channel-coded symbol stream, the particular encoder providing space-time coding to the first channel-coded symbol stream and to the second channel-coded symbol stream, the particular encoder generating the first space-time-channel-coded symbol stream and the second space-time-channel-coded symbol stream, wherein the wireless spread spectrum mobile cellular phone supports voice communications, multimedia communications and navigational communications, wherein the wireless spread spectrum mobile cellular phone supports wireless communications with a wireless local area network, wherein the wireless spread spectrum mobile cellular phone supports e-mail communications, video conference communications and Internet communications, wherein at least the QPSK mapper, the first MTCM encoder and QPSK mapper unit, the second MTCM encoder and QPSK mapper unit and the particular encoder are part of an outer encoder and/or an inner encoder, wherein information transferred between the inner encoder and the outer encoder is evaluated to determine at least a number of turbo iterations, a stopping criteria, a symbol interleaver span and a symbol interleaver depth, and wherein the information transferred between the inner encoder and the outer encoder is evaluated using extrinsic information transfer (EXIT) chart based analysis.

10. The wireless spread spectrum mobile cellular phone according to claim 9, wherein the wireless spread spectrum mobile cellular phone supports redundant non-binary modulation in combination with a finite-state encoder.

11. The wireless spread spectrum mobile cellular phone according to claim 9, wherein the QPSK mapper, the first MTCM encoder and QPSK mapper unit, the first symbol selector and puncturer, the symbol interleaver, the second MTCM encoder and QPSK mapper unit, the symbol de-interleaver arrangement, the second symbol selector and puncturer and the particular encoder are part of one or more wireless transmitters.

12. The wireless spread spectrum mobile cellular phone according to claim 9, wherein the wireless spread spectrum mobile cellular phone supports code division multiple access.

13. The wireless spread spectrum mobile cellular phone according to claim 9, wherein the wireless spread spectrum mobile cellular phone supports orthogonal frequency division multiplexing.

14. The wireless spread spectrum mobile cellular phone according to claim 9, wherein the wireless spread spectrum mobile cellular phone comprises a Universal Mobile Telecommunications System phone system.

15. The wireless spread spectrum mobile cellular phone according to claim 9, wherein the wireless spread spectrum mobile cellular phone supports redundant non-binary modulation in combination with a finite-state encoder.

16. The wireless spread spectrum mobile cellular phone according to claim 9, wherein the wireless spread spectrum mobile cellular phone supports telemetry communication systems.

17. The wireless spread spectrum mobile cellular phone according to claim 9, wherein the wireless spread spectrum mobile cellular phone supports space-time turbo-coded modulation.

18. The wireless spread spectrum mobile cellular phone according to claim 9, wherein the wireless spread spectrum mobile cellular phone supports block space-time coding.

19. The wireless spread spectrum mobile cellular phone according to claim 9, wherein the wireless spread spectrum mobile cellular phone supports convolutional space-time coding.

20. The wireless spread spectrum mobile cellular phone according to claim 9, wherein the plurality of antennas are arranged so that a fading correlation between the antennas is below 0.5.

21. The wireless mobile cellular phone according to claim 1, wherein the wireless mobile cellular phone supports facsimile communications.

22. The wireless spread spectrum mobile cellular phone according to claim 9, wherein the wireless spread spectrum mobile cellular phone supports facsimile communications.

* * * * *

UNITED STATES PATENT AND TRADEMARK OFFICE
CERTIFICATE OF CORRECTION

PATENT NO. : 7,460,607 B2  Page 1 of 1
APPLICATION NO. : 10/606924
DATED : December 2, 2008
INVENTOR(S) : Pieter van Rooyen and Danie van Wyk It is certified that error appears in the above-identified patent and that said Letters Patent is hereby corrected as shown below:

Column 6, line 57 delete "arrangment" and insert --arrangement--.

Column 6, line 60 delete "and".

Column 6, line 61 delete "second".

Column 7, line 55 delete "puncturer coupled" and insert --puncturer operatively coupled--.

Column 7, line 57 delete "is" and insert --being--.

Column 7, line 66 delete "arrangment" and insert --arrangement--.

Column 8, line 2 delete "provided" and insert --provide--.

Signed and Sealed this

Seventeenth Day of March, 2009

JOHN DOLL
*Acting Director of the United States Patent and Trademark Office*